H. E. POTTS.
CONTACT PROCESS.
APPLICATION FILED JUNE 17, 1918.
1,335,257.
Patented Mar. 30, 1920.
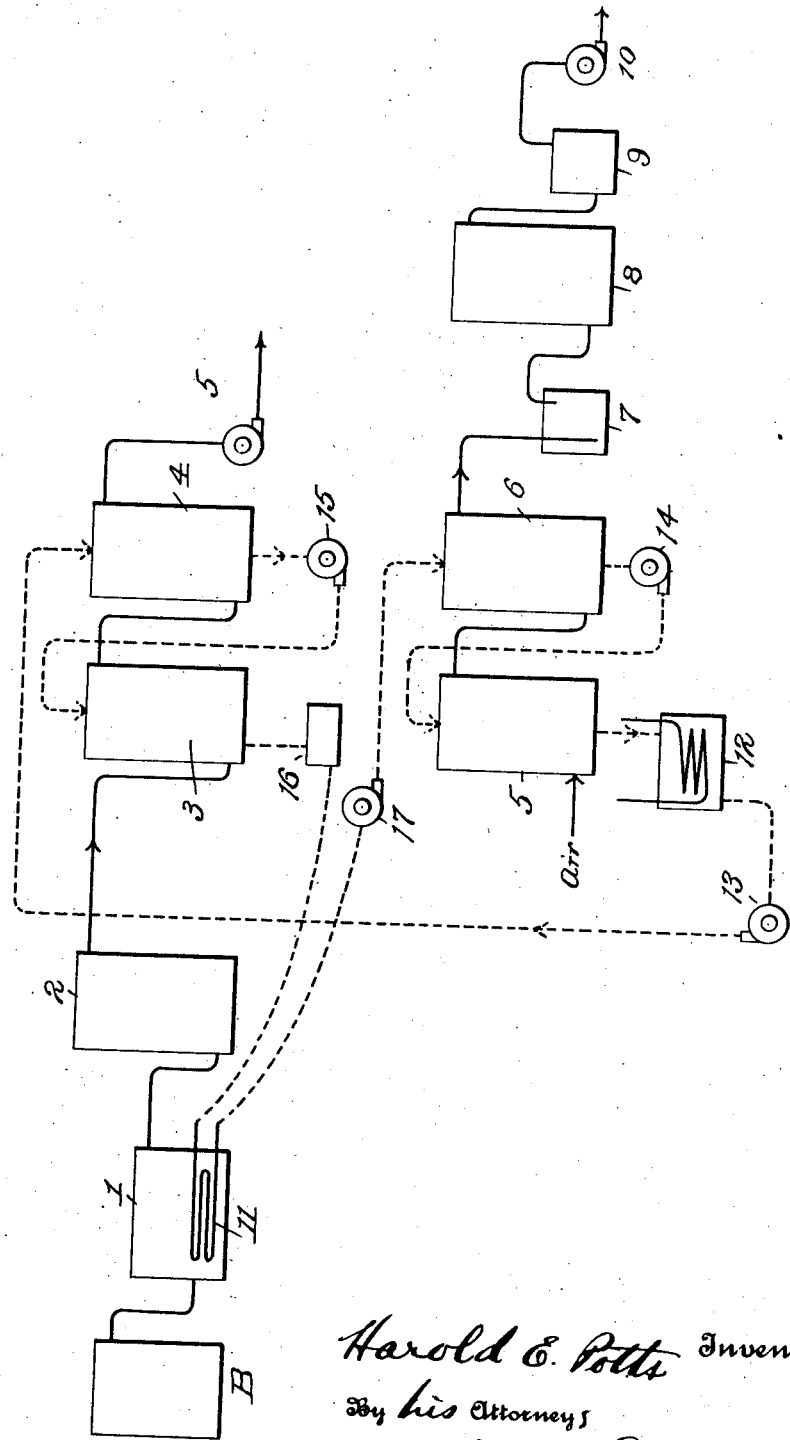
Harold E. Potts, Inventor
By his Attorneys
Knight Bros

UNITED STATES PATENT OFFICE.

HAROLD E. POTTS, OF LIVERPOOL, ENGLAND, ASSIGNOR TO SIMON-CARVES, LTD., OF MANCHESTER, ENGLAND.

CONTACT PROCESS.

1,335,257.  Specification of Letters Patent.  Patented Mar. 30, 1920.

Application filed June 17, 1918. Serial No. 240,433.

*To all whom it may concern:*

Be it known that I, HAROLD E. POTTS, a subject of the King of Great Britain, residing in Liverpool, Lancashire county, England, have invented certain new and useful Improvements in Contact Processes, of which the following is a full and clear specification.

Although Hanisch and Schroeder proposed to liquefy $SO_2$ from burner gases, and then to mix the pure gas so obtained with air and catalyze it by platinum to form $SO_3$, the whole trend of development in practice has been along the lines of purifying burner gas by removing prejudicial impurities and then converting the purified gas by platinum contact.

This method presents the disadvantage that the impurities are very difficult to remove and according to my invention I transfer the $SO_2$ from a stream of the impure burner gases to a stream of air in such manner that the $SO_2$ concentration in the air is of the same order of magnitude as that in the original burner gas, and I then dry this second stream and subject it to a catalyst to produce $SO_3$.

The transference of the $SO_2$ advantageously is effected by water though dilute acid may also be employed. I prefer to pass the gases first through a dust chamber and a wash of relatively strong acid in order to remove the coarser impurities to avoid excessive contamination of the circulating water which transfers the $SO_2$; this strong acid may be circulated down a tower and in this tower the weak acid made in the circulatory system may be concentrated.

The transference is effected on the counter-current system and it is based on the principle that according to Henry's law the equilibrium between $SO_2$ in the liquid and gas phases is reversible and dependent only on the temperature and acid concentration of the solution and on the partial pressure of $SO_2$ in the gas. In other words the final equilibrium in a given system is the same at a given temperature and pressure if, say, one part by weight of $SO_2$ is present in a given volume of gas, which is then brought into contact with a given volume of solution, or whether the same weight of $SO_2$ is present in the solution which is then brought into contact with a given volume of air. It follows from this that if a given volume of burner gas containing, say, 7% of $SO_2$ is washed with water on the counter-current principle, and this solution of $SO_2$ is then brought into contact with air on the counter-current principle the enriched air leaving the saturated solution coming from the absorbers will be of about the same strength (7% $SO_2$) as the burner gas which was in final contact with the solution in the absorbers. This transference of $SO_2$ may be facilitated by raising the temperature of the liquid to be treated by air, say, 10 or 20° C. to reduce the solubility of gas, or by cooling the liquid in the absorbing system. This may be effected by heating or cooling the air and burner gas respectively or by arranging a cooler in circuit with the liquid in the absorbers, and a heat interchanger (warmed by burner gases) in circuit with the system in which the air acts on the solution, which may be termed the evolving system.

In this way a gas is obtained which is eminently suitable for the contact process since the $SO_2$ from the original gas has been retained, while the undesirable impurities have been allowed to escape, or if they are absorbed in the circulating liquid, they will no longer be in the same excessively finely distributed form so that they will not contaminate the stream of $SO_2$ laden air; a simple scrubber can be intercalated between the evolving system and the drying system.

It was proposed by Hanisch and Schroeder in 1883 (British Patent No. 2621 of 1883) to remove $SO_2$ from furnace gases containing little $SO_2$ by cold water and to blow hot air into the solution to warm the solution by the burner gases to 100° C. and then to convert it into spray which was treated with hot air, an elaborate system of heat interchange was suggested to economize the heat involved in the alternate heating of the water to 100° C. and cooling it again. The resultant gas was stated to contain 20% of $SO_2$ and to be suitable "for the direct manufacture of sulfuric acid." No drying was described, and such gas is too strong for efficient conversion by the contact process.

My invention is primarily for the treatment of burner gases containing the normal amount of $SO_2$ and its object is to separate the $SO_2$ not from products of combustion of fuel so much as from finely divided impurities and flue dust which would inhibit the catalytic activity of platinum. My invention does not postulate the necessity of heating the solution of $SO_2$ to 100° C., but depends for its efficacy on the distribution law, *i. e.*, on the fact that by the counter-current principle it is possible to obtain a transference of $SO_2$ from one stream of (impure) gas to another stream of air at substantially the same concentration and at the same or almost the same temperature; it is therefore based on an entirely different physico-chemical principle than the above process which simply depends on the well known reduction of solubility of $SO_2$ in water at a higher temperature.

It will be seen that if the burner gases contain about 6 or 7% $SO_2$, the resulting gas will contain about the same amount so that it is suitable for conversion. It will liberate enough heat by the exothermic reaction.

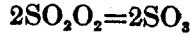
$$2SO_2O_2 = 2SO_3$$

to dispense with the necessity of heating the gases prior to conversion except by the well known heat interchange with the $SO_3$ produced, and on the other hand, it will not be so rich as to necessitate the employment of special cooling means for the contact chamber. With the contact chambers now usually employed, concentrations of 5% and 10% represent the approximate working limits. The strength of the gas may be controlled by adjusting the volume of air or the temperatures of the liquids in the absorbing and evolving systems so that there is the possibility of control of the $SO_2$ percentage in addition to the usual control at the burners.

The liquid in the absorbing and evolving system may be circulated by pumps, elevators, &c., over one, two or more towers in each system; and it is advisable to close in the whole of these systems to avoid loss of $SO_2$ to the atmosphere.

The accompanying drawing shows by way of example, a diagrammatic flow sheet of the plant.

The gases leave the burner B, passing through the dust chamber 1 and the strong acid wash tower 2 (weak acid may be employed here if desired). The gases pass through the two absorbing towers 3, 4 and are discharged through the fan 5.

Air is pulled through the two evolving towers 5, 6, the scrubber 7, drying tower 8, and scrubber 9 by the blower 10 after which it passes through a contact system and an absorbing system of any known type.

The flow of water is shown by the dotted lines. The cold water is fed down tower 4, to pump 15, then down tower 3 to tank 16, when it is saturated with $SO_2$. The liquor passes through heat interchange pipes 11 and flows through pump 17 and down tower 6 to pump 14, then down tower 5 through cooler 12 and pump 13 to return again to the top of tower 4 and so on cyclically.

I claim:—

1. A process of making $SO_3$ which comprises transferring $SO_2$ from a stream of burner gas to a solvent liquid and then bringing air in contact with the liquid to remove the $SO_2$ without substantial increase of $SO_2$ concentration in the air stream as compared with the burner gas, drying said stream of air charged with $SO_2$ and converting said dried $SO_2$ into $SO_3$ by a catalyst.

2. A process of making $SO_3$ which comprises washing a stream of burner gas, transferring its $SO_2$ to a solvent liquid and then bringing air in contact with the liquid to remove the $SO_2$, drying the gas and converting $SO_2$ into $SO_3$ by a catalyst.

3. A process of making $SO_3$ which includes transferring $SO_2$ from a stream of burner gas to a body of water and then bringing air in contact with the water to remove the $SO_2$, these operations being conducted at a temperature not far removed from the temperature of the atmosphere.

4. A process of making $SO_3$ which includes transferring $SO_2$ from a stream of burner gas to a stream of air without substantial increase in $SO_2$ concentration, alternately passing burner gas and air in contact with a solvent liquid which liquid is warmed by heat interchange prior to imparting its $SO_2$ to the stream of air and cooled prior to absorbing the $SO_2$ from the stream of burner gases.

5. A process of making $SO_3$ which includes transferring $SO_2$ from a stream of burner gas to a stream of air by alternately passing burner gas and air in contact with a solvent liquid so that the concentration of $SO_2$ in the stream of air is between about 5% and 10%.

6. A process of making $SO_3$ which comprises transferring $SO_2$ from a stream of burner gas containing in the neighborhood of 7% of $SO_2$ to a stream of air which after the operation contains in the neighborhood of 7% of $SO_2$, drying said stream and converting the $SO_2$ to $SO_3$ by a catalyst.

HAROLD E. POTTS.